United States Patent
Mohammed-Fakir et al.

(10) Patent No.: US 6,637,753 B2
(45) Date of Patent: Oct. 28, 2003

(54) SUPPLEMENTAL SEAL FOR THE CHORDAL HINGE SEALS IN A GAS TURBINE

(75) Inventors: Abdul-Azeez Mohammed-Fakir, Schenectady, NY (US); Ahmad Safi, Troy, NY (US); Iain Robertson Kellock, Simpsonville, SC (US); Gary Michael Itzel, Simpsonville, SC (US); Brian Peter Arness, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/028,930

(22) Filed: Dec. 28, 2001

(65) Prior Publication Data

US 2003/0122321 A1 Jul. 3, 2003

(51) Int. Cl.⁷ .............................. F16J 15/08; F01D 9/04
(52) U.S. Cl. ....................... 277/416; 277/543; 277/637; 277/650; 415/191; 415/209.2; 415/209.3
(58) Field of Search ................................. 277/355, 416, 277/543, 544, 637, 650; 415/189, 174.2, 174.3, 191, 209.2, 209.3

(56) References Cited

U.S. PATENT DOCUMENTS

| | | | |
|---|---|---|---|
| 4,184,689 A | | 1/1980 | Brodell et al. |
| 4,314,793 A | * | 2/1982 | DeTolla et al. ............. 415/135 |
| 4,318,668 A | * | 3/1982 | Chaplin et al. ............. 415/135 |
| 4,815,933 A | | 3/1989 | Hansel et al. |
| 5,118,120 A | * | 6/1992 | Drerup et al. ............... 277/628 |
| 5,149,250 A | | 9/1992 | Plemmons et al. |
| 5,154,577 A | * | 10/1992 | Kellock et al. ........... 415/170.1 |
| 5,271,714 A | | 12/1993 | Shepherd et al. |
| 5,372,476 A | | 12/1994 | Hemmelgarn et al. |
| 5,645,398 A | * | 7/1997 | Benoist et al. ............... 415/134 |
| 5,653,580 A | * | 8/1997 | Faulder et al. ........... 415/209.3 |
| 5,797,723 A | * | 8/1998 | Frost et al. ............... 415/174.2 |
| 6,065,756 A | * | 5/2000 | Eignor et al. ................ 277/545 |
| 6,095,750 A | | 8/2000 | Ross et al. |
| 6,164,656 A | * | 12/2000 | Frost .......................... 277/312 |
| 6,435,820 B1 | * | 8/2002 | Overberg ..................... 415/138 |
| 6,464,232 B1 | * | 10/2002 | Marchi et al. .............. 277/630 |
| 6,572,331 B1 | * | 6/2003 | Mohammed-Fakir et al. .... 415/191 |

* cited by examiner

*Primary Examiner*—Anthony Knight
*Assistant Examiner*—Alison K. Pickard
(74) *Attorney, Agent, or Firm*—Nixon & Vanderhye

(57) ABSTRACT

In a gas turbine having a chordal hinge seal between an inner rail of each nozzle segment and an annular axially facing sealing surface of a nozzle support ring, a supplemental seal is disposed between the support ring and inner rail of each nozzle segment radially inwardly of the chordal hinge seal. To minimize or prevent leakage flow across the chordal hinge seal, the seal is formed of flexible sheet metal which extends between the inner rail and a seat projecting from the annular sealing surface of the support ring radially inwardly of the chordal hinge seal. A first margin of the flexible seal engages in an arcuate groove carried by the inner rail. The opposite margin extends arcuately in sealing engagement along the seat carried by the nozzle support ring.

20 Claims, 6 Drawing Sheets

SUPPLEMENTAL SEAL FOR THE CHORDAL HINGE SEALS IN A GAS TURBINE

BACKGROUND OF THE INVENTION

The present invention relates to seals in a gas turbine for supplementing the chordal hinge seals between turbine nozzles and a turbine nozzle support ring and particularly relates to supplementary seals for substantially minimizing or eliminating leakage losses past the chordal hinge seals.

In a gas turbine, hot gases of combustion flow from combustors through first-stage nozzles and buckets and through the nozzles and buckets of follow-on turbine stages. The first-stage nozzles typically include an annular array or assemblage of cast nozzle segments each containing one or more nozzle stator vanes per segment. Each first-stage nozzle segment also includes inner and outer band portions spaced radially from one another. Upon assembly of the nozzle segments, the stator vanes are circumferentially spaced from one another to form an annular array thereof between annular inner and outer bands. A nozzle retaining ring coupled to the outer band of the first-stage nozzles supports the first-stage nozzles in the gas flow path of the turbine. An annular nozzle support ring, preferably split at a horizontal midline, is engaged by the inner band and supports the first-stage nozzles against axial movement.

In an exemplary arrangement, eighteen cast segments are provided with two vanes per segment. The annular array of segments are sealed one to the other along adjoining circumferential edges by side seals. The side seals seal between a high pressure region radially inwardly of the inner band, i.e., compressor discharge air at high pressure, and the hot gases of combustion in the hot gas flow path which are at a lower pressure.

Chordal hinge seals are used to seal between the inner band of the first-stage nozzles and an axially facing surface of the nozzle support ring. Each chordal hinge seal includes an axial projection which extends linearly along a chord line of the inner band portion of each nozzle segment. Particularly, the chordal hinge seal extends along an inner rail of each segment and which rail extends radially inwardly of the inner band portion. The chordal hinge seal projection lies in sealing engagement with the axially opposite facing sealing surface of the nozzle support ring.

During operation and/or repair of the first-stage nozzle, it has been found that warpage can leave gaps between the chordal hinge seals and the sealing surface of the nozzle support ring. These gaps enable leakage past the chordal hinge seals from the high pressure area radially within the annular inner band into the hot gas flow path. That is, the chordal hinge seals are inadequate to prevent leakage flow as the chordal hinge seal projections lose contact with the sealing surface of the nozzle support ring. Consequently, there is a need for a supplemental seal at the interface of the first-stage nozzles and nozzle support ring to minimize or eliminate the leakage flow past the chordal hinge seals.

BRIEF DESCRIPTION OF THE INVENTION

In accordance with a preferred embodiment of the present invention, there is provided a supplemental seal between the first-stage nozzles and the nozzle support ring which eliminates or minimizes leakage past the chordal hinge seals. The supplemental seal includes a flexible, preferably sheet metal, leaf seal secured between the inner rail of each nozzle segment and the sealing surface of the nozzle support ring on the high pressure side of the chordal hinge seal. Particularly, the supplemental leaf seal has an arcuate first margin which is received in an arcuate groove opening along the inner face of the inner rail. The first margin is preferably pinned in the groove by a plurality of pins at spaced circumferential positions along the inner rail. The flexible seal extends generally radially inwardly, terminating in an arcuate second margin extending in a generally circumferential direction. A face of the second margin engages a seat projecting axially from the annular surface of the nozzle support ring.

The supplemental leaf seal lies directly between the high pressure region and regions radially outwardly of the supplemental seal, including the chordal hinge seal. Leakage flow past the chordal hinge seal is therefore minimized or eliminated as a result of the sealing of the second margin of the supplemental seal against the seat of the nozzle support ring. The supplemental seals may be overlapped along their end edges to seal the gaps between the nozzle segments. It will be appreciated that upon axial warpage or deformation of the nozzle support ring or nozzle segments, or both, the flexible leaf seal of the supplemental seal is maintained in sealing engagement against the seat by the difference in pressure between the high and low pressure regions on opposite sides of the seal.

In a preferred embodiment according to the present invention, there is provided a turbine comprising a turbine nozzle support ring having a generally axially facing first surface, a turbine nozzle segment having at least one stator vane and including an inner band carrying an inner rail, the inner rail having a second surface in axial opposition to the first surface, one of the first and second surfaces including an axially extending projection therealong for engagement with another of the first and second surfaces to form a first seal therebetween and a supplemental seal extending between the inner rail and the support ring at a location radially inwardly of the first seal and between at least opposite end edges of the segment, the supplemental seal including a seat projecting axially from the support ring and a flexible leaf seal having a first margin thereof secured to the inner rail and a second margin sealingly engageable against the seat.

In a further preferred embodiment according to the present invention, there is provided a gas turbine comprising a turbine nozzle support ring having a generally axially facing first surface, a plurality of turbine nozzle segments each having at least one stator vane and an inner rail, the inner rails of the segments forming a generally annular second surface in axial opposition to the first surface, each of the segments including an axially extending projection along the second surface thereof for engagement with the first surface to form a first seal therebetween, a plurality of supplemental seals extending between the inner rails and the support ring at locations radially inwardly of the first seals, each supplemental seal including a seat projecting axially from the support ring and a flexible leaf seal having a first margin secured to the inner rail, and a second margin sealingly engageable against the seal.

DETAILED DESCRIPTION OF THE INVENTION

Figure 1:
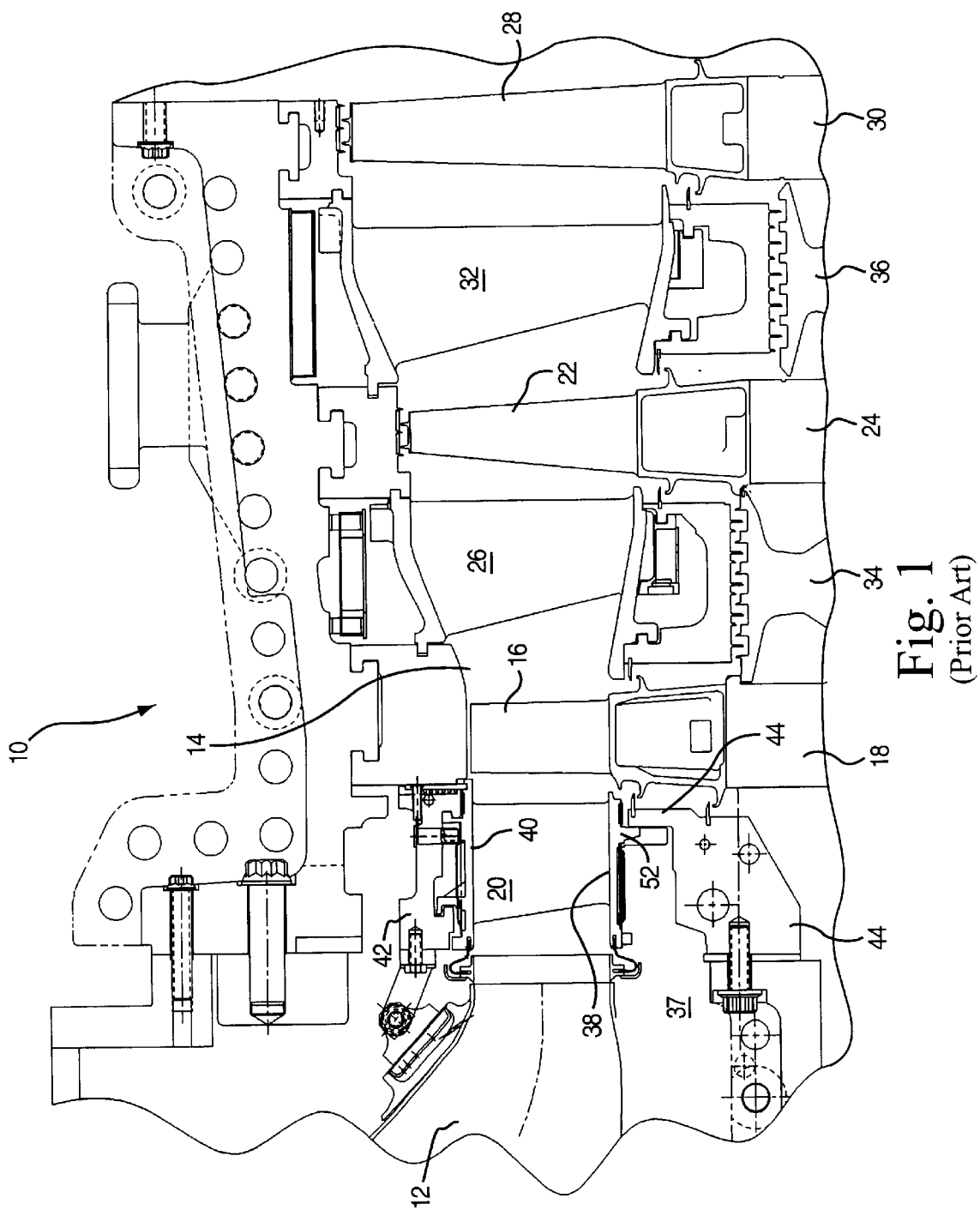
FIG. 1 is a fragmentary schematic side elevational view of a portion of a gas turbine.

Referring now to FIG. 1, there is illustrated a representative example of a turbine section of a gas turbine, generally designated 10. Turbine 10 receives hot gases of combustion from an annular array of combustors, not shown, which transmit the hot gases through a transition piece 12 for flow along an annular hot gas path 14. Turbine stages are disposed along the hot gas path 14. Each stage comprises a plurality of circumferentially spaced buckets mounted on and forming part of the turbine rotor and a plurality of circumferentially spaced stator vanes forming an annular array of nozzles. For example, the first stage includes a plurality of circumferentially-spaced buckets 16 mounted on a first-stage rotor wheel 18 and a plurality of circumferentially-spaced stator vanes 20. Similarly, the second stage includes a plurality of buckets 22 mounted on a rotor wheel 24 and a plurality of circumferentially-spaced stator vanes 26. Additional stages may be provided, for example, a third stage comprised of a plurality of circumferentially-spaced buckets 28 mounted on a third-stage rotor wheel 30 and a plurality of circumferentially-spaced stator vanes 32. It will be appreciated that the stator vanes 20, 26 and 32 are mounted on and fixed to a turbine casing, while the buckets 16, 22 and 28 and wheels 18, 24 and 30 form part of the turbine rotor. Between the rotor wheels are spacers 34 and 36 which also form part of the turbine rotor. It will be appreciated that compressor discharge air is located in a region 37 disposed radially inwardly of the first stage and that such air in region 37 is at a higher pressure than the pressure of the hot gases flowing along the hot gas path 14.

Figure 2:
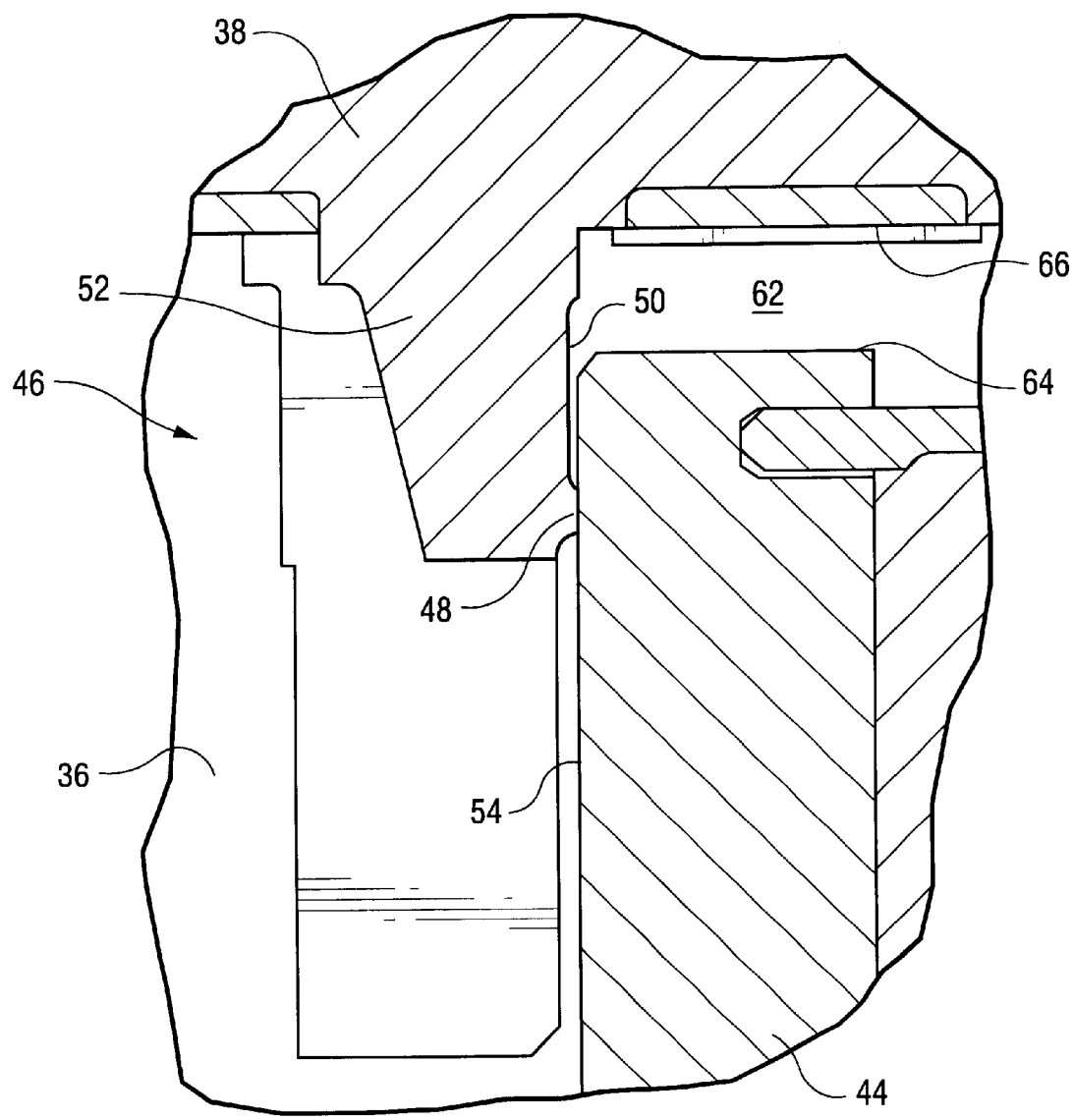
FIG. 2 is an enlarged fragmentary cross-sectional view illustrating a conventional chordal seal hinge.
Figure 3:
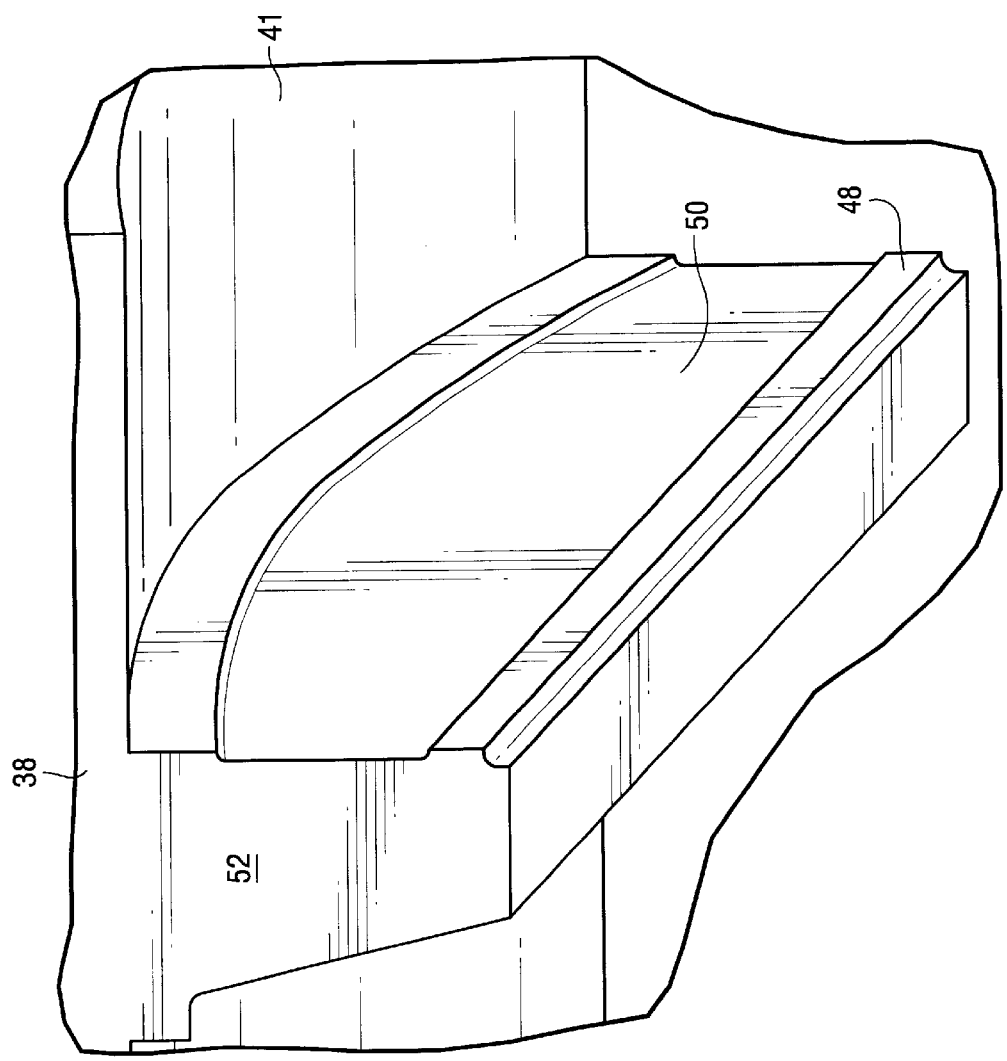
FIG. 3 is a fragmentary perspective view illustrating a portion of a conventional chordal hinge seal along an inner rail of a nozzle segment.
Figure 4:
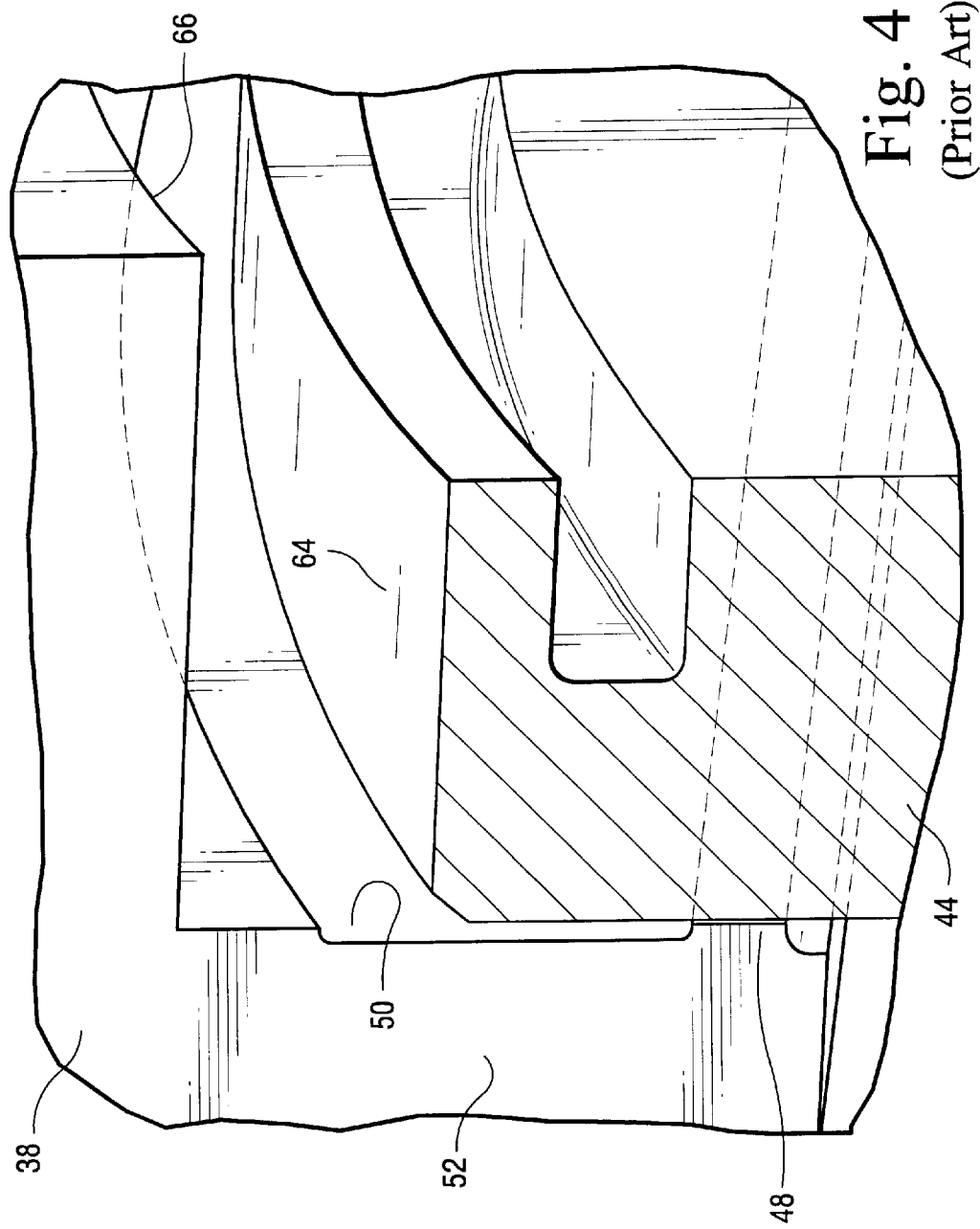
FIG. 4 is a fragmentary perspective view with parts in cross-section illustrating the conventional chordal hinge seal in sealing engagement with a nozzle support ring of the gas turbine.

Referring to the first stage of the turbine, the stator vanes 20 forming the first-stage nozzles are disposed between inner and outer bands 38 and 40, respectively, supported from the turbine casing. As noted above, the nozzles of the first stage are formed of a plurality of nozzle segments 41 (FIG. 3) each mounting one, preferably two, stator vanes extending between inner and outer band portions and arranged in an annular array of segments. A nozzle retaining ring 42 connected to the turbine casing is coupled to the outer band and secures the first-stage nozzle. A nozzle support ring 44 radially inwardly of the inner band 38 of the first-stage nozzles engages the inner band 38. Particularly, the interface between the inner band 38 and the nozzle support ring 44 includes an inner rail 52 (FIG. 2). The inner rail 52 includes a chord-wise, linearly extending axial projection 48, generally and collectively hereinafter referred to as a chordal hinge seal 46. Projection 48 extends along an axial facing surface 50 of the inner rail 52 which forms an integral part of each nozzle segment and specifically the inner band 38. The projection 48 engages a first annular surface 54 of the nozzle support ring 44. It will be appreciated that high pressure compressor discharge air lies in the region 37 and lower pressure hot gases flowing in the hot gas path 14 lie on the opposite side of the seal 48. The chordal hinge seal 46 thus is intended to seal against leakage from the high pressure region 37 into the lower pressure region of the hot gas path 14.

As noted previously, however, in operation, component parts of the nozzles and nozzle support ring will tend to form leakage gaps between the projection 48 and the surface 54 of the nozzle support ring 44 whereby leakage flow may occur from the high pressure region to the low pressure region. In order to minimize or prevent leakage flow into the hot gas path 14, and in accordance with a preferred embodiment of the present invention, there is provided a supplemental leaf seal for sealing between the first-stage nozzles and the nozzle support ring 44. The supplemental leaf seal, generally designated 70, includes a seal body 72 preferably formed of flexible sheet metal having a first margin 74 for engaging within a groove 76 (FIG. 5) formed along a radial inner surface 73 of the inner rail 52 of each segment. Seal 70 also includes a second margin 78 along an opposite side thereof for engaging a seat 80 formed on the nozzle support ring 44. Both the first and second margins 74 and 78 of the supplemental leaf seal 70 are arcuate in a circumferential direction about the long axis of the turbine, i.e., the axis of the rotor. The seat 80 likewise is arcuate in a circumferential direction about the axis of the rotor. The seat 80 projects axially from a mounting plate 82 secured, for example, by welding to the annular surface 54 of the nozzle support ring 44. While the seal body 72 may extend in a circumferential direction a length corresponding in length to the circumferential extent of the nozzle segment, more particularly, the inner rail 52, the seat 82 may be formed about the nozzle support ring in larger circumferential segments, for example, 90° or 180° segments.

To secure the seal 70 to the inner rail 52, the first margin 74 of the seal body 72 is inserted into the groove 76. A plurality of pins 86 are inserted through openings 88 in the inner rail 52, as well as openings through the first margin of the seal body 72. The pins are secured at opposite ends, for example, by welding, and support the flexible seal 70 from the inner rail.

Figure 5:
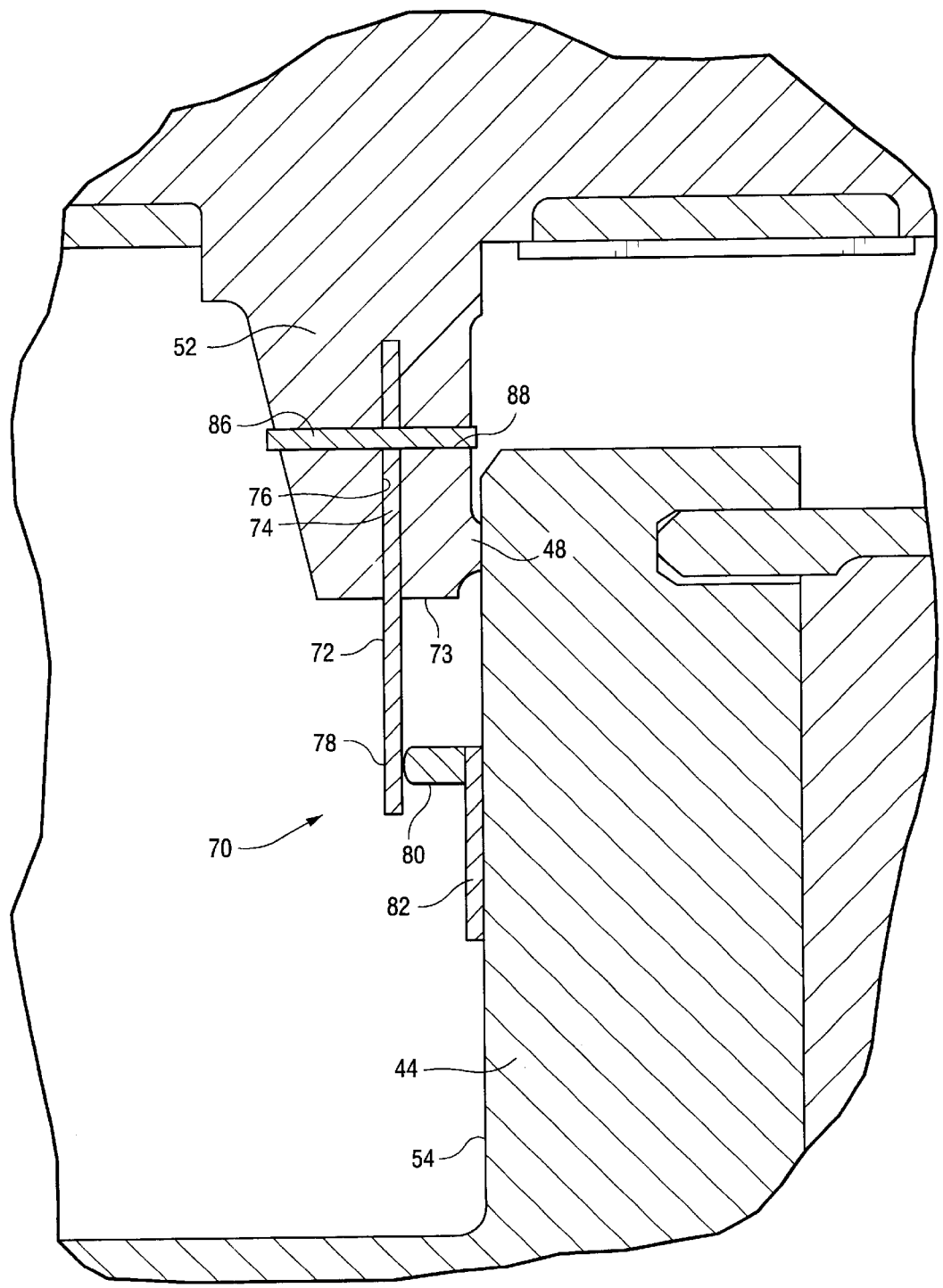
FIG. 5 is an enlarged fragmentary cross-sectional view illustrating a supplemental seal constructed in accordance with the present invention, sealing between a nozzle segment and the nozzle support ring.
Figure 6:
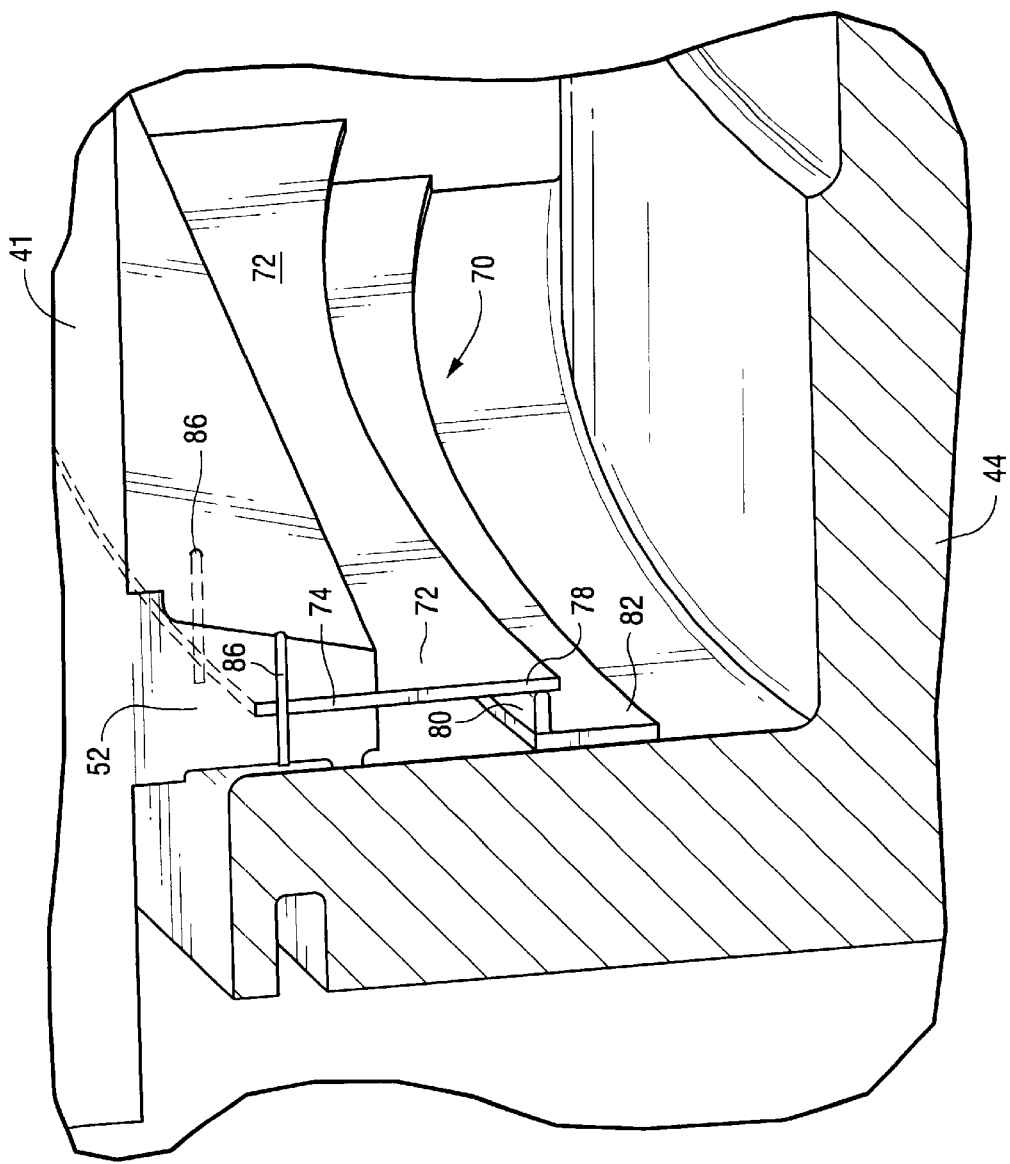
FIG. 6 is a perspective view thereof.

As best illustrated in FIGS. 5 and 6, the supplemental leaf seal 70 lies radially inwardly of the chordal hinge seal 46, including the projection 48. The supplemental seal 70 therefore seals between the high pressure region 37 and a downstream region on the opposite side of seal 70. Thus, the seal 70 is exposed to the high pressure region 37, enabling the sheet metal seal body 72 to flex under pressure into sealing engagement with the seat 80 due to the pressure differential on opposite sides of seal 70. Any leakage flow past the supplemental leaf seal 70 encounters the chordal hinge seal 46 at a lower pressure. Thus, the pressure difference across the chordal hinge seal is minimized, reducing leakage flow. Preferably, the supplemental seal segment is provided in an arcuate length corresponding to the length of each nozzle segment. Adjacent ends of the seal body 72 carried by adjacent nozzle segments may overlap one another to provide effective intersegment supplemental seals at the joint between adjacent nozzle segments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine comprising:
   a turbine nozzle support ring having a generally axially facing first surface;
   a turbine nozzle segment having at least one stator vane and including an inner band carrying an inner rail, said inner rail having a second surface in axial opposition to said first surface;

one of said first and second surfaces including an axially extending projection therealong for engagement with another of said first and second surfaces to form a first seal therebetween; and a supplemental seal extending between said inner rail and said support ring at a location radially inwardly of said first seal and between at least opposite end edges of said segment, said supplemental seal including a seat projecting axially from said support ring and a flexible leaf seal having a first margin thereof secured to said inner rail and a second margin radially inwardly of said first margin sealingly engageable against said seat upon flexing of said leaf seal.

2. A turbine according to claim 1 wherein said second margin of said flexible seal is arcuate in a circumferential direction about an axis of the turbine.

3. A turbine according to claim 2 wherein said first margin extends arcuately along said inner rail in a circumferential direction about the axis of the turbine.

4. A turbine according to claim 1 wherein said flexible seal comprises sheet metal.

5. A turbine according to claim 1 including a groove formed in said inner rail, said first margin of said seal being disposed in and secured to said groove, said second margin of said flexible seal extending arcuately in a circumferential direction, said flexible seal being formed of sheet metal and said seat extending arcuately along said first surface in a circumferential direction about the axis of the turbine.

6. A turbine according to claim 1 including a groove formed in said inner rail, said first margin of said seal being disposed in and secured to said groove, said flexible seal being formed of sheet metal, and a pair of pins extending in said inner rail and through said flexible seal along said first margin thereof to retain said flexible seal in said groove.

7. A turbine according to claim 6 wherein said groove, said first margin and said second margin are arcuate in a circumferential direction about an axis of the turbine.

8. A turbine according to claim 1 wherein said supplemental seal seals between a high pressure region and a lower pressure region on opposite sides thereof, said flexible leaf seal being flexed to maintain said second margin in sealing engagement against said seat in response to a pressure differential between said high and lower pressure regions.

9. A turbine according to claim 8 wherein the second margin of said flexible seal is flexed into sealing engagement with said seat in response solely to the pressure difference between the high and lower pressure regions.

10. A turbine according to claim 8 wherein said flexible seal forms the sole seal between the high and lower pressure regions on opposite sides of the supplemental seal.

11. A gas turbine comprising:

a turbine nozzle support ring having a generally axially facing first surface;

a plurality of turbine nozzle segments each having at least one stator vane and an inner rail, said inner rails of said segments forming a generally annular second surface in axial opposition to said first surface, each of said inner rails including an axially extending projection along said second surface thereof for engagement with said first surface to form a first seal therebetween;

a plurality of supplemental seals extending between said inner rails and said support ring at locations radially inwardly of said first seals, each supplemental seal including a seat projecting axially from said support ring and a flexible leaf seal having a first margin secured to the inner rail, and a second margin sealingly engageable against said seat.

12. A turbine according to claim 11 wherein said axially extending projection along each of said nozzle segments extends along a chord line of each said segment.

13. A turbine according to claim 11 wherein said first margins of said flexible seals are arcuate in a circumferential direction about an axis of the turbine.

14. A turbine according to claim 11 wherein each of said flexible seals comprises sheet metal.

15. A turbine according to claim 11 including a groove formed in each said inner rail of each nozzle segment, each of said flexible seals being formed of sheet metal and having a said first margin thereof including an edge received in said groove.

16. A turbine according to claim 15 wherein said axially extending projection along each of said nozzle segments extends along a chord line of each said segment, said grooves and said first and second margins of said flexible seals extending in a circumferential direction about an axis of the turbine.

17. A turbine according to claim 16 wherein each of said flexible seals is comprised of sheet metal.

18. A turbine according to claim 11 wherein said supplemental seals seal between high and lower pressure regions on opposite sides thereof, said flexible leaf seals being flexed to maintain said second margins thereof in sealing engagement against said seats in response to a pressure differential between said high and lower pressure regions.

19. A turbine according to claim 18 wherein the second margins of said flexible seals are flexed into sealing engagement with said seats in response solely to the pressure difference the high and lower pressure regions.

20. A turbine according to claim 18 wherein each of said flexible seals forms the sole seal between high and lower pressure regions on opposite sides of the supplemental seal.

* * * * *